United States Patent
Astala et al.

(10) Patent No.: US 7,251,775 B1
(45) Date of Patent: Jul. 31, 2007

(54) SYSTEM AND METHOD FOR VISUAL HISTORY PRESENTATION AND MANAGEMENT

(75) Inventors: Arto Astala, Vantaa (FI); Charlotta Willstedt, Linköping (SE); Marcus Davidsson, Linköping (SE)

(73) Assignee: Nokia Corporation, Espoo (FI)

( * ) Notice: Subject to any disclaimer, the term of this patent is extended or adjusted under 35 U.S.C. 154(b) by 674 days.

(21) Appl. No.: 09/708,093

(22) Filed: Nov. 8, 2000

Related U.S. Application Data (63) Continuation-in-part of application No. 09/607,276, filed on Jun. 30, 2000.

(51) Int. Cl.
*G06F 17/00* (2006.01)

(52) U.S. Cl. .................. 715/501.1; 715/513; 715/526

(58) Field of Classification Search ............. 715/501.1, 715/513, 501, 512, 744, 781, 863, 530, 739, 715/526, 764; 707/10, 100; 725/37; 345/764; 709/203, 245
See application file for complete search history.

(56) References Cited

U.S. PATENT DOCUMENTS

| | | | | |
|---|---|---|---|---|
| 5,471,578 A * | 11/1995 | Moran et al. ................ 715/863 |
| 5,485,565 A * | 1/1996 | Saund et al. ................ 345/442 |
| 5,583,542 A * | 12/1996 | Capps et al. ................ 345/173 |
| 5,590,219 A * | 12/1996 | Gourdol ...................... 382/202 |
| 5,717,939 A * | 2/1998 | Bricklin et al. ............. 715/503 |
| 5,838,326 A | 11/1998 | Card et al. |
| 5,874,958 A | 2/1999 | Ludolph ...................... 715/781 |
| 5,897,648 A * | 4/1999 | Henderson ................... 715/530 |
| 5,918,237 A * | 6/1999 | Montalbano ................ 715/513 |
| 5,963,964 A * | 10/1999 | Nielsen ..................... 715/501.1 |
| 5,991,441 A * | 11/1999 | Jourjine ...................... 382/187 |
| 6,133,916 A * | 10/2000 | Bukszar et al. ............. 715/744 |
| 6,188,398 B1 * | 2/2001 | Collins-Rector et al. ...... 725/37 |
| 6,356,908 B1 * | 3/2002 | Brown et al. .................. 707/10 |
| 6,405,192 B1 * | 6/2002 | Brown et al. .................. 707/3 |
| 6,460,060 B1 * | 10/2002 | Maddalozzo et al. ....... 715/513 |
| 6,526,424 B2 * | 2/2003 | Kanno et al. ............... 715/512 |
| 6,557,015 B1 * | 4/2003 | Bates et al. ............. 715/501.1 |
| 6,665,838 B1 * | 12/2003 | Brown et al. ............ 715/501.1 |
| 6,667,751 B1 * | 12/2003 | Wynn et al. ................ 345/833 |
| 6,670,974 B1 * | 12/2003 | McKnight et al. .......... 715/855 |
| 6,928,616 B2 * | 8/2005 | Drane et al. ................ 715/739 |
| 7,031,968 B2 * | 4/2006 | Kremer et al. .............. 707/100 |
| 2002/0054778 A1* | 5/2002 | Ericson et al. ................ 400/76 |
| 2002/0059584 A1* | 5/2002 | Ferman et al. ................ 725/34 |
| 2003/0014415 A1* | 1/2003 | Weiss et al. .................. 707/10 |

(Continued)

OTHER PUBLICATIONS

Ayers et al., "Using Graphic History in Browsing the World Wide Web", 4th Intl. WWW Conf. Dec. 11-14, 1996 downloaded Sep. 8, 2004 from http://www.w3j.com/1/ayers.270/paper/270.html.*

(Continued)

*Primary Examiner*—Heather R. Herndon
*Assistant Examiner*—James H Blackwell
(74) *Attorney, Agent, or Firm*—Banner & Witcoff, Ltd.

(57) ABSTRACT

A method and computer program for managing and presenting a visual history of web pages accessed by a user. This method and computer program is able to create a screen of thumbnail snapshots of web pages for presentation to a user. These thumbnail snapshots are reduced images of the actual web pages themselves that the user has visited. Associated with each thumbnail snapshot is a universal resource locator for the web page. The history of the web pages visited may be displayed in a toolbar which is scrollable.

23 Claims, 7 Drawing Sheets

U.S. PATENT DOCUMENTS

| | | | | |
|---|---|---|---|---|
| 2003/0052918 | A1* | 3/2003 | Drane et al. | 345/764 |
| 2003/0122865 | A1* | 7/2003 | Lake et al. | 345/738 |
| 2003/0179214 | A1* | 9/2003 | Saund et al. | 345/619 |
| 2003/0179235 | A1* | 9/2003 | Saund et al. | 345/764 |
| 2004/0054701 | A1* | 3/2004 | Garst | 708/131 |

OTHER PUBLICATIONS

Hightower et al., "Graphical Multiscale Web Histories: A Study of PadPrints", ACM Hypertext '98 Conference, Jun. 20-24, 1998.*

Kandogan et al, "Elastic Windows: A Hierarchical Multi-Window World-Wide Web Browser", Copyright 1997, ACM, pp. 169-177.*

Robertson et al, "Data Mountain: Using Sptial Memory for Document Management", Copyright 1998, ACM, pp. 153-162.*

Weiss et al., "Semi-Offline Internet Search Engine: Internet Search Engine With Rresults Preview and Optional Link Hopping and Nested Preview Features", U.S. Appl. No. 60/184,331, filed Feb. 23, 2000.*

Kaasten, Shaun and Saul Greenberg. "Designing an Integrated Bookmark/History System for Web Browsing," Proceedings of the Western Computer Graphic Symposium 2000, Mar. 26, 2000, Panorama Mountain Village, BC, Canada.

Tauscher, Linda and Saul Greenberg. "How people revisit web pages: empirical findings and implications for the design of history systems," International Journal of Human-Computer Studies, Academic Press, New York, NY, US, vol. 47, No. 1, Jul. 1997, pp. 97-137.

* cited by examiner

SYSTEM AND METHOD FOR VISUAL HISTORY PRESENTATION AND MANAGEMENT

This application is a continuation-in-part of the U.S. patent application Ser. No. 09/607,276, filed on Jun. 30, 2000, entitled "SYSTEM AND METHOD FOR STORING BOOKMARKS AND HISTORY INFORMATION SPATIALLY ON A DISPLAY."

CROSS-REFERENCE TO RELATED APPLICATIONS

This application is related to co-pending U.S. patent application Ser. No. 09/607,369 filed on Jun. 30, 2000, entitled "USER INTERFACE CONSTRUCTED FROM COMPONENTS CREATED FROM A SET OF TAGS" co-pending U.S. patent application Ser. No. 09/609,581 filed on Jun. 30, 2000, entitled "NETWORK WITH MOBILE TERMINALS HAVING WIRELESS ACCESS TO THE INTERNET AND METHOD FOR DOING SAME", co-pending U.S. patent application Ser. No. 09/659,416 filed on Jun. 30, 2000, entitled "INTELLIGENT TERMINAL FUNCTIONING AS BROWSER", and co-pending U.S. patent application Ser. No. 09/707,887 filed on Jan. 21, 2004, entitled "SYSTEM AND METHOD FOR VISUAL BOOKMARK PRESENTATION AND MANAGEMENT" all assigned to and commonly owned by Nokia Corporation of Espoo, Finland and are herein incorporated by reference.

FIELD OF THE INVENTION

The invention relates to a system and method for visual history presentation and management. More particularly, the invention is a system and method in which compressed snapshots of web pages may be displayed on a screen to indicate the web sites a user has most recently visited.

BACKGROUND OF THE INVENTION

With the explosion in Internet access and usage individuals have discovered that they may now receive a large amount of information in their homes and offices almost immediately from any number of sources. These sources include everything from the latest news, weather, and sports to stocks, bond and commodity prices. Currently, a typical Internet user would have a browser installed in his local computer or server such as Internet Explorer™ or Netscape™. Using this browser, the user would access an Internet service provider (ISP), such as America-On-Line (AOL™), via a modem over the local public switched telephone network (PSTN). Once logged onto the Internet server, the user may utilize one of the many search engines, such as Yahoo™ or Lycos™, to specify search terms. The user may also use a web crawler, spider or robot to attempt to find a product, service or information desired. The search engine or web crawler would then respond with a list of web sites which matched the search terms the user provided. The user would then log onto a web site and view the products or services available for sale or receive the information desired. Further, if the user discovers a web site he prefers, the user may store the universal resource locator (URL) in a favorites' directory for later quick access. This storage of the URL in a favorites directory is often referred to as bookmarking the entry and the entry is then referred to as a bookmark. In addition to bookmarks, the browser may keep in a history of the web pages visited by storing each URL accessed. Thereafter, the user may revisit the web page by accessing the favorites directory and searching for a title for the web page associated with a URL. However, once some number of bookmarks has been accumulated, the user may find it difficult to identify the bookmark desired based on the title alone. Further, in some instances the designers of the web page may not necessarily create a title for a web page as in the case of purely graphic web pages. Therefore, the user may be forced to try and recognize the bookmark using solely the URL. The user under the circumstances would find it frustrating to look through a large number of bookmarks by title and URL to identify the web page desired. In addition, the user may often are need to access several web pages before discovering the bookmark associated with the desired web page. This also applies to the history file. A user or system administrator would often have to access the web site to determine the nature of the content therein.

To overcome this problem of inadequate description of bookmarks Nielsen in U.S. Pat. No. 5,963,964, issued on Oct. 5, 1999, the contents of which are incorporated herein by reference, proposes substituting a thumbnail snapshot of the web page itself for the title or the URL used as a bookmark. However, in the case of a history file, it is still necessary to open the file and access the history by time period.

Therefore, what is needed are a system and method in which a history of web pages accessed may be organized for presentation as web pages so that they may be easily discovered and accessed by a user. The system and method should further present to the user the history of web page access as thumbnail snapshots. Further, this system and method should display these thumbnail snapshots to the user in such a fashion that the user may identify the web page of interest and access it quickly.

SUMMARY OF THE INVENTION

An embodiment of the present invention provides for a method or computer program for presenting and managing bookmarks. This method begins by having the user enter the name of a map. This map represents a screen layout having several thumbnail snapshots contained in the screen. The user then selects a web page to be stored as a bookmark. The web page is reduced in size to that of a thumbnail snapshot. The user then positions the thumbnail snapshot on the map. Thereafter, the thumbnail snapshot is stored with the map in a bookmark database.

These and other features of this device, method and computer program will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Before beginning a detailed description of the subject invention, mention of the following is in order. When appropriate, like reference numerals and characters maybe used to designate identical, corresponding or similar components in differing figure drawings. Further, in the detailed description to follow, exemplary sizes/models/values/ranges may be given, although the present invention is not limited to the same.

Figure 1:
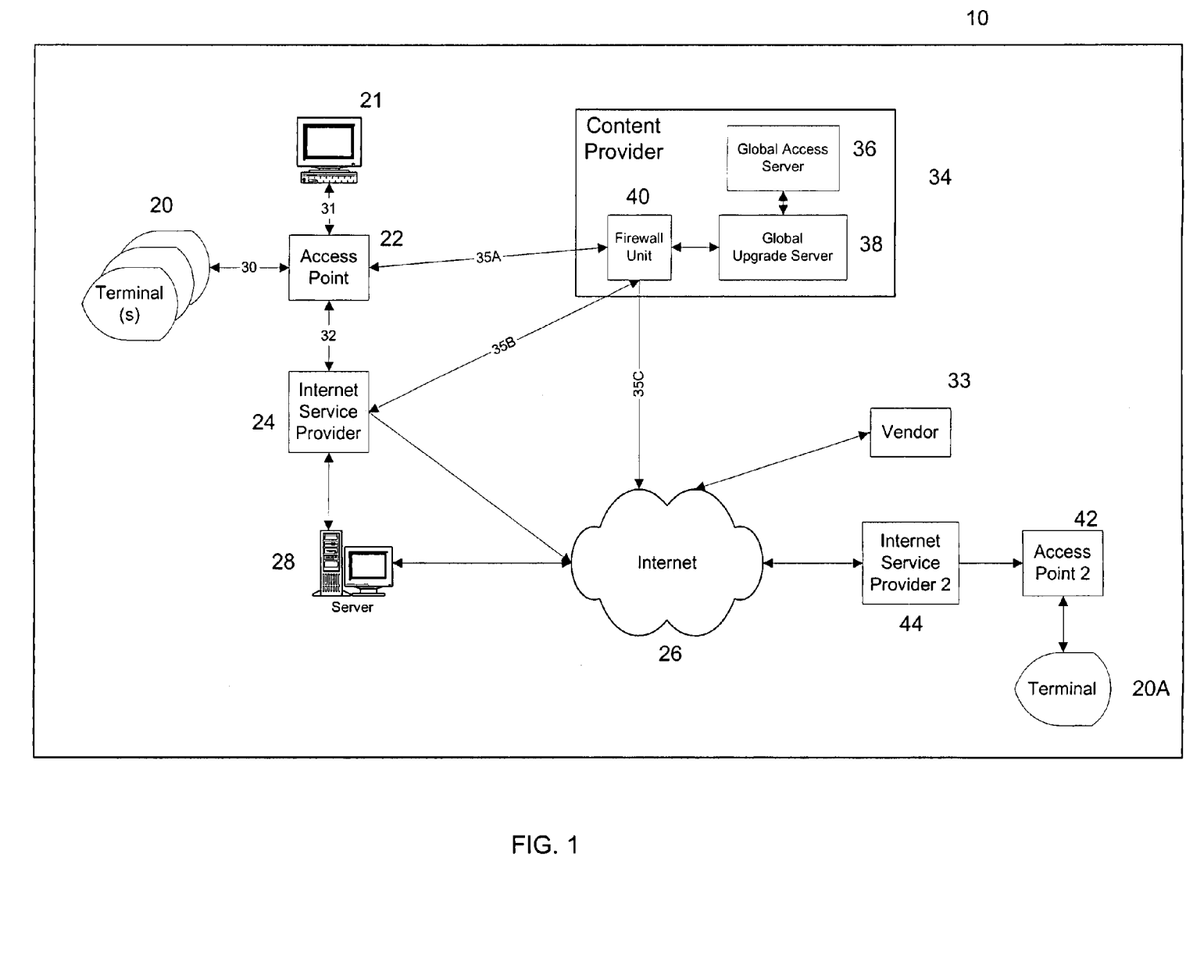
FIG. 1 is a block diagram representation of a communication network having mobile terminals that are capable of communicating with a system having a server with related services.

FIG. 1 is a block diagram representation of a communication network having mobile terminals that are capable of communicating with a system having a server with related services. In FIG. 1, a network 10 includes a terminal 20 coupled to an access point 22. This terminal 20 may be, but not limited to, WAP-capable cellular telephone, a HTML-capable cellular telephone, or a processor-based system connected to a cellular telephone. This processor-based system may be, but not limited to, a palm computer, lap-top computer or personal computer. Further, the terminal 20 is not limited to the use of a cellular phone and may also use the public switched telephone network (PSTN) or a satellite telephone or any form of communications lines 30 such as standard twisted pair phone lines, coax cable and fiber optics. These communications lines 30 may be leased lines including: T1 lines capable of transmitting at 1.54 Mbits/sec; T3 lines capable of transmitting at 45 Mbits/sec; E1 lines capable of transmitting at 2.048 Mbits/sec; and E3 lines capable of transmitting at 34 Mbits/sec. Therefore, communications lines 30 may take the form of any radio frequency based communications or any form of line or cable based communications.

The terminal 20 using communications lines 30 connects to an access point 22 coupled to an Internet Service Provider (ISP) 24 through communications lines 32, which is coupled to an Internet 26. Again, communications lines 32 may take the form of any radio frequency based communications or any line or cable based communications system. Since the access point 22 is coupled to the Internet 26 it has an Internet address relative to the Internet address of the ISP 24. Additionally, in an example embodiment, the ISP 24 is coupled to a server 28 that provides the user, through the terminal 20, with specific services and features, which will be discussed in detail ahead. In another example embodiment, the server 28 is coupled directly to the Internet 26 and, hence, the terminal 20 would access the server 28 through the Internet 26.

Still referring to FIG. 1, the terminal 20 includes a virtual keyboard, a two-fingered navigational tool, which is the subject of related application serial number U.S. Ser. No. 09/607,359 entitled "SYSTEM AND METHOD FOR PROVIDING A VIRTUAL KEYBOARD FOR A WIRELESS TERMINAL"; a two-fingered pressure sensitive special click-drag-drop feature, which is the subject of related application serial number U.S. Ser. No. 09/607,638 entitled "METHOD AND APPARATUS FOR TOUCH SCREEN INPUT"; and a unique Graphical User-interfaces (GUI), which is the subject of related U.S. application Ser. No. 09/607,369; entitled "USER INTERFACE CONSTRUCTED FROM COMPONENTS CREATED FROM A SET OF TAGS". The server 28 provides services such as email, calendar functions, notes, the ability to shop online with the necessary authentication, as well as third party services and information, which is the subject of related application U.S. Ser. No. 09/609,581, entitled "NETWORK WITH MOBILE TERMINALS HAVING WIRELESS ACCESS TO THE INTERNET AND METHOD FOR DOING SAME", U.S. application Ser. No. 09/607,637 entitled "NETWORK WITH MOBILE TERMINALS AS BROWSERS HAVING WIRELESS ACCESS TO THE INTERNET AND METHOD FOR USING SAME".

Still referring to FIG. 1, terminal 20 may represent any number of similar or different terminals as previously discussed above. Terminal 20 is connected to the access point 22 via communications line 30 enabling the user have access to the Internet 26 and the services provided by the server 28. In an example embodiment where terminal 20 is a cellular telephone with WAP-capability or a cellular phone connected to a palm computer, a personal digital assistant (P.A.), or a laptop, the user would have mobile access to Internet 26 and server 28. Additionally, a personal computer (PC) terminal 21 is coupled to the access point 22 via a landline 31. The terminal 21 can be used to access the server 28 using special authentication by any user authorised to access the information and services provided by the server 28. However, the authentication for the user using the terminal 21, which is discussed in further detail ahead, is slightly different from the authentication procedure for the terminal 20, where terminal 20 is a mobile terminal. More specifically, the terminal 20 is coupled to the access point 22 using a Wireless Local-Area-Network Gateway (PLAN GO) (not shown) that is installed at a specific location, such as the user's home or place of business. In an example embodiment, the PLAN GO interface uses Ethernet 802.11 transfer protocol. However, other wireless interface protocols, such as GARS of Global System for Mobile Communications (GSM+), Universal Mobile Telecommunication Systems (UMTS), or any type of local area network (LAN), may be used without limiting the spirit and scope of the present invention as set forth in the claim claims. If the terminal 20 is powered on and within range of the access point 22, then an Ethernet protocol may be used as a transfer protocol in order to establish and maintain a communication link.

Although the example embodiment shows the terminal 20 coupled to the server 28 through the ISP 24, the scope of the present invention, as set forth in the claims, is not limited thereby. For example, the terminal 20 may be coupled directly to the server 28 through the access point 22.

Regardless of how the terminal 20 is coupled to the server 28, once the terminal 20 is authenticated, as will be discussed ahead, it can function as an Internet browser to access the Internet 26 with the additional ability to retrieve services and information from the server 28. Furthermore, in the example embodiments set forth herein, the ISP 24 is separate from and not acting as the server 28 and vice versa, even though it is possible to combine them into one unit.

As would be appreciated by one of ordinary skill in the art and as previously discussed, even though the example embodiments show the access point 22 coupled to the ISP 24 through a communications line 32, the scope of the present invention as set forth in the claims is not limited thereby. For example, the access point 22 can be wirelessly by any means of radio frequency communications or by any wire or cable based communications system coupled to the ISP 24. Thus, in the example embodiments, the terminal 20 accesses the ISP 24 through the access point 22 and, thus, the user can access, navigate through, and retrieve information from the Internet 26 using the terminal 20.

Still referring to FIG. 1, in order for a terminal, such as terminal 20, to have access to the services of the server 28, the server 28 must authenticate and authorize the terminal's access. Although only the authentication and authorization procedure relating to the terminal 20 are discussed in detail, the teachings set forth herein are also applicable to other types of terminals. Upon proper authentication of terminal 20, the user can access the services of the server 28 at the authorized level of authentication.

Generally if the terminal 20 is powered on and authenticated by the server 28, then information or services from the server 28 are downloaded to the terminal 20. The server 28 downloads information, such as profile settings for a group. One profile setting that can be downloaded is language preferences for a shared communication session. Other information or services may include configuration data, driver or application related software or portions thereof, partial sections of system software, or configurable parameters depending on the level of authentication that has occurred with respect to the user. Additionally, the terminal 20 can have access through proper authentication and service purchases, third party publications available from a content provider or vendor 33. This content may include items such as national or international news, related information found in magazine publications or the daily newspaper. As would be appreciated by one of ordinary skill in the art this information may be purchased by the user and then transmitted by the vendor 33 upon request of the user's group at the server 28 and then to all terminals within the group of the terminal 20; alternatively, the information could be purchased by an operator/owner of the services provided by the terminal 28 and then resold to each group as requested. Thus, a group profile can also include access to the information services of the vendor 33 that can be made available to the group or just the user, depending on the authentication.

There are two levels of authentication that provide access to the services and information of the server 28. The first is at the group level and the second is at the individual level. The group level is a level of authentication that occurs based on the identity of the terminal 20 in order to initiate a shared session. In order to create a group, at least one terminal is needed, but typically there are several terminals 20 that make up a group, and each terminal 20 has a unique identity that allows that terminal access to a shared session at the group level. Furthermore, each group includes a specific group profile and this group profile is downloaded during a shared session from the server 28. Thus, anyone having access to the terminal 20 would have access to the group level information and services, such as calendar functions, e-mail, bookmarks, cookies, and e-publication, all of which are set up for the group. As will be discussed ahead, these same services may be available to the user at the individual level, but the content of the information would vary. The server 28 includes storage capacity for storing data related to the group in a group specific storage unit that can be accessed and used by all terminals within the group once the terminal has been authenticated and the shared session initiated.

In an example embodiment, the group level authentication is based on the identity of the hardware of the terminal 20 and the authentication occurs automatically to initiate the shared session once the terminal 20 is powered on. Even though the authentication at the group level occurs automatically, the scope of the invention as set forth in the claims is not limited thereby. For example, the terminal 20 could request input from the user in order to initiate the group level authentication process. Once the terminal 20 is authorized to access the services, then each user of a terminal 20 is able to access information and services that are available to all users in the group as well as initiate an individual communication session to access individual information and services available only to that user, provided the user has a profile associated with group and associated with the terminal that has established the shared session that is in progress.

Still referring to FIG. 1, unlike the shared session at the group level, an individual session at the individual level is a level of authentication that requires input from the user to allow the user of a terminal 20 to access information intended only for that user. For example, the user could use any terminal 20 that is within the user's group and initiate an individual session to access information and services specific to that user. The authentication can be done using anything that is unique and only known by that user, such as a password. Thus, the user can initiate an individual session regardless of which terminal is being used. When the user activates an individual session then configuration parameters, which are specific to the user, are downloaded to the terminal 20. Although in the preferred embodiment a user must have a profile associated with the same group that the terminal's profile is associated, the scope and spirit of the present invention is not limited thereby. For example, the network 10 could be set up to allow a user access from any terminal 20 or 21 regardless of the association between the user, the terminal 20, and the group as long as the user can be authenticated by the server 28. This is similar to the manner by which a user would gain access to the server 28 from the terminal 21.

As indicated above, anyone having access to the terminal 20 would have access to the group level information and services, because authentication is based on the terminal 20 and occurs automatically and the shared session is always active when the terminal 20 is powered on. Even though any user of the terminal 20 can have access to information and services at the group level, only a designated user can change the group or take actions on behalf of the group. In an example embodiment, one or two users within the group are typically designated to have administrative rights for the group. The user/users with administrative rights are called a group administrator. The group administrator has the right to alter group profiles and the information related to the group administrator is stored in the server 28 and administration access can be authenticated by a password. The group administrator, once authenticated, can alter the group profile settings, add or delete terminal profiles form the group profile, and add or delete user profiles form the group profile.

One group setting that the group administrator can select is the language setting for the shared sessions. However, each user can select his or her own language preference for the individual sessions. For example, in a multilingual group, the group language can be one specific language, while the language for each user may be different during the individual session for that user. Then depending on the session type, which is either family or individual, the terminal 20 will show text in the selected language, which is established in the group or individual profile, respectively.

Additionally, the group administrator can have access to purchasing services that may require the ordering party to be of legal age for the purpose of ordering or purchasing additional services, such as news or publication services. Thus, while all users of the terminal would have access to group level services, such as access to the Internet 26, they would not be able to make administrative decision, unless they were authenticated as the group administrator. Accordingly, the group is protected from unauthorized or unwanted alteration of group profile as well as financial commitments from occurring at the group level from the terminal 20, especially given that the identity of the user of the terminal 20 is not unknown at the group level yet that user has access to the server 28 as well as the Internet 26 through the terminal 20 coupled to the ISP 24.

Still referring to FIG. 1, in addition to the ISP 24, the access point 22 is also coupled to a global unit or content provider 34. In an example embodiment, the access point 22 may communicate with the content provider 34 through a link 35A. Alternatively, the access point 22 may communicate with the content provider 34 through a communication line 32, the ISP 24, and a link 35B. In yet another alternative embodiment, the access point 22 may communicate with the content provider 34 through a communication line 32, the ISP 24, the Internet 26, and a link 35C.

Still referring to FIG. 1, the content provider 34 includes a global address server 36, a global upgrade server 38, and a firewall unit 40. It will be apparent to those skilled in the art that the firewall unit 40 functions to provide secured access to the global address server 36 and the global upgrade server 38. In an example embodiment, the Internet address of the content provider 34 with the global address server 36 is permanently contained in the memory of the terminal 20. Even though reference is made hereinafter only to the Internet address of the global address server 36 without specific reference to the Internet address of the content provider 34, as would be appreciated by one of ordinary skill in the art the Internet addresses for the two may be the same or could be slightly different depending on configuration parameters. The global address server 36 is a place from which all the terminals 20 can fetch the Internet address of their respective server. The advantage of having the terminal 20 store the Internet address of the global address server 36 is that if the terminal 20 was relocated near another access point, then the terminal 20 can still obtain the Internet address location of the server 28 simply by knowing the Internet address of the global address server 36. However, the scope of the invention as set forth in the claims is not limited thereby. For example, the Internet address of the server 28 could be stored on the terminal 20 and the memory of the terminal 20 could be updated as needed.

Still referring to FIG. 1, an advantage to storing the Internet address of the global address server 36 on the terminal 20 is that the association between terminal and server as well as changes in the Internet address of servers can be easily and efficiently updated without having to update the memory of each terminal. The global update server 38 updates the global address server 36 each time there is a change in the association between terminal 20 and server 28, when there are new terminals 20 to associate with a server 28, or if the Internet address of a particular server 28 is changed.

Still referring to FIG. 1, with the Internet address of the global address server 36 stored in the memory of the terminal 20, the terminal 20 is able to request and retrieve the Internet address of the server 28 from the global address sever 36. The global address server 36 stores information about the location of the server 28 and all other servers in the network and the corresponding relation between each terminal 20 and its server 28. Thus, the terminal 20A is always able to obtain the address of the server 28, which is the server designed to serve the terminal 20. For example, the terminal 20A coupled through an access point a 42 to an ISP 44 can retrieve the Internet address of the server 28 from the global address server 36, provided that the server 28 is the server designated to and serve the terminal 20A and that the terminal 20A is authenticated by the server 28 as an authorized user of the services.

Figure 2:
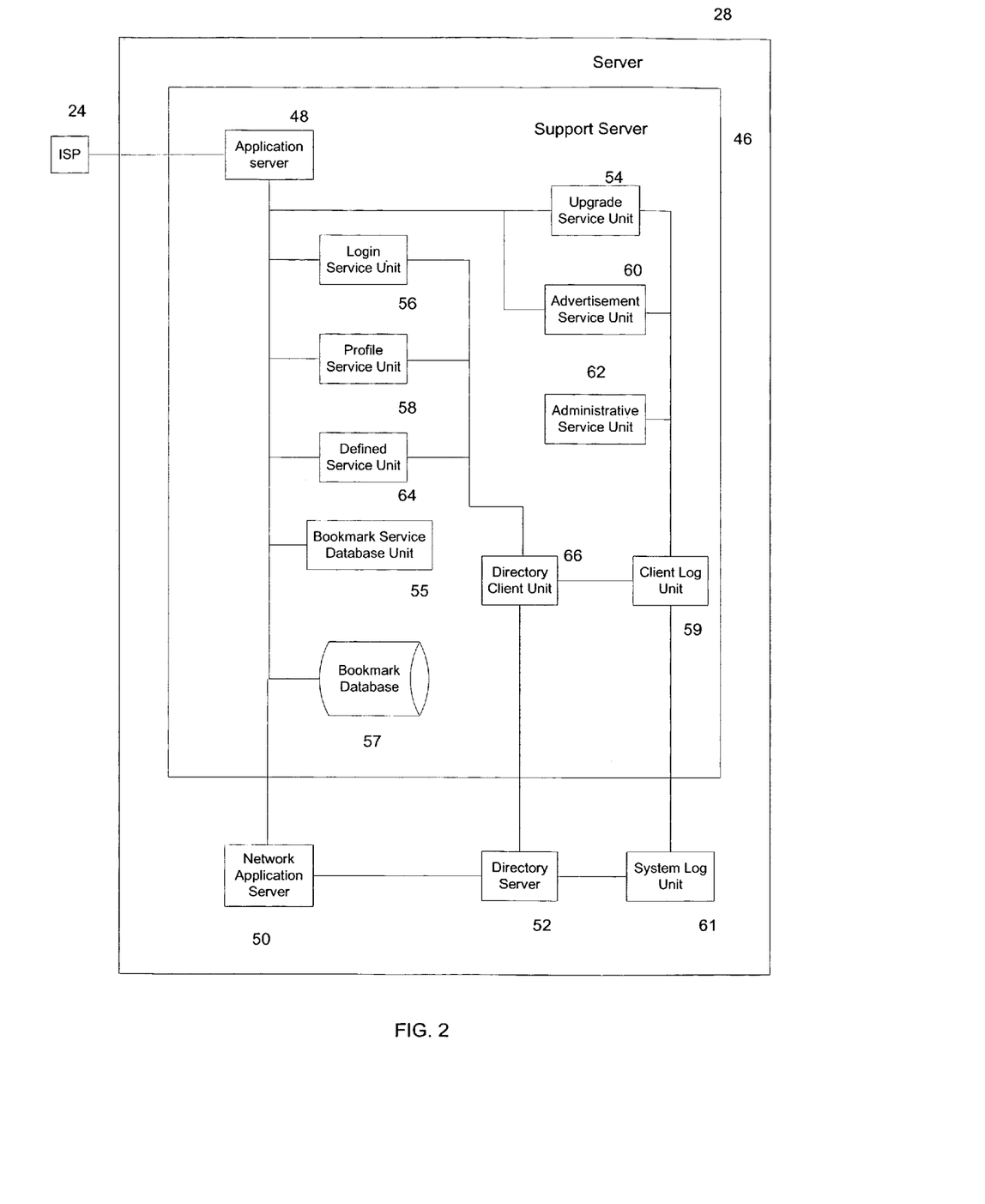
FIG. 2 is a more detailed block diagram representation of the server of the system of the network shown in FIG. 1.

FIG. 2 is a more detailed block diagram representation of the server of the system of the network shown in FIG. 1. In FIG. 2, the server 28 includes a support server 46, a response handler or application server 48, a network application server 50, and a directory server 52. As would be appreciated by one of ordinary skill in the art the referenced connections do not depict the physical connections between the elements but merely logical connections. The support server 46 provides services oriented towards enabling and supporting the services provided to the terminal 20. The support server 46 includes an upgrade service unit 54, a bookmark service database unit 55, a login services unit 56, a bookmark database 57, a profile services unit 58, a client log unit 59 for collecting information about clients, an advertisement services unit 60, a system log unit 61 for collecting information about events in the server 28 from the client log unit 59, an administrative services unit 62, a defined services unit 64, and a directory client unit 66.

Still referring to FIG. 2, the upgrade services unit 54 is dedicated to controlled software upgrade of the software for the support server 46. Updates are transmitted from the global upgrade server 38 to the upgrade service unit 54. The login services unit 56 provides for authentication of the user and the terminal 20 that is being used to access the services based on information provided by the client unit 66. Additionally, the login services unit 56 is also responsible for log-off activities, such as individual session termination. The profile services unit 58 provides for modifying a user's profile information. This modification of a user's profile may include modifying the group and individual information and preferences. The administration services unit 62 provides for administration of the support server 46 and the application server 48. The advertisement services unit 60 provides for the server 28 to tailor advertisements to the user and the terminal 20 according to the user's profile information. The defined services unit 64 is a classification of "other services" containing items such as bookmark management services, help services, log services, name management services, and general management services. The directory client unit 66 is coupled to the directory server 52 to provide client verification.

Figure 3A:
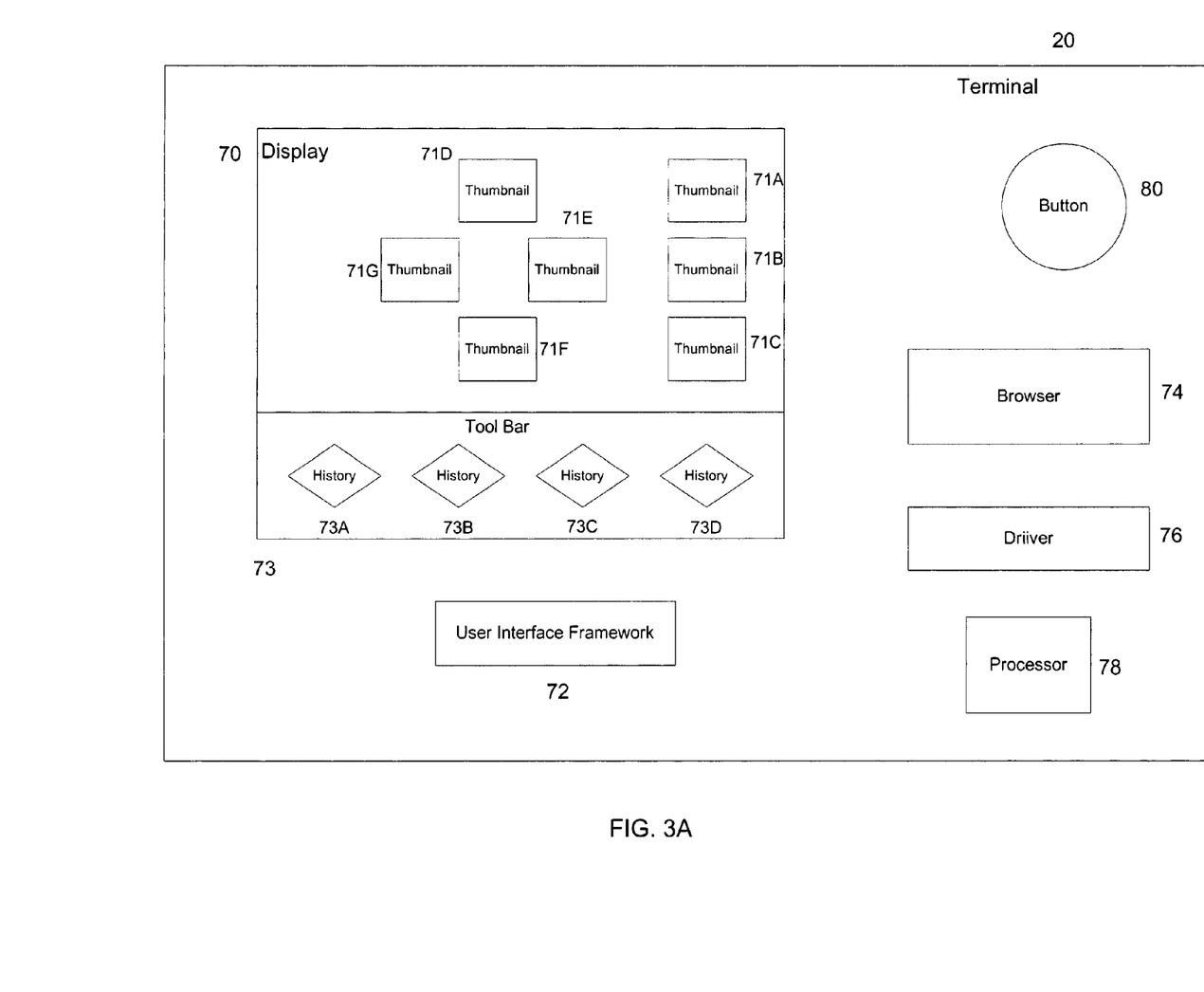
FIG. 3A is a more detailed block diagram of a terminal, which shows the spatial storage of bookmarks and history on the display with a toolbar, operating within the system shown in FIG. 1.
Figure 3B:
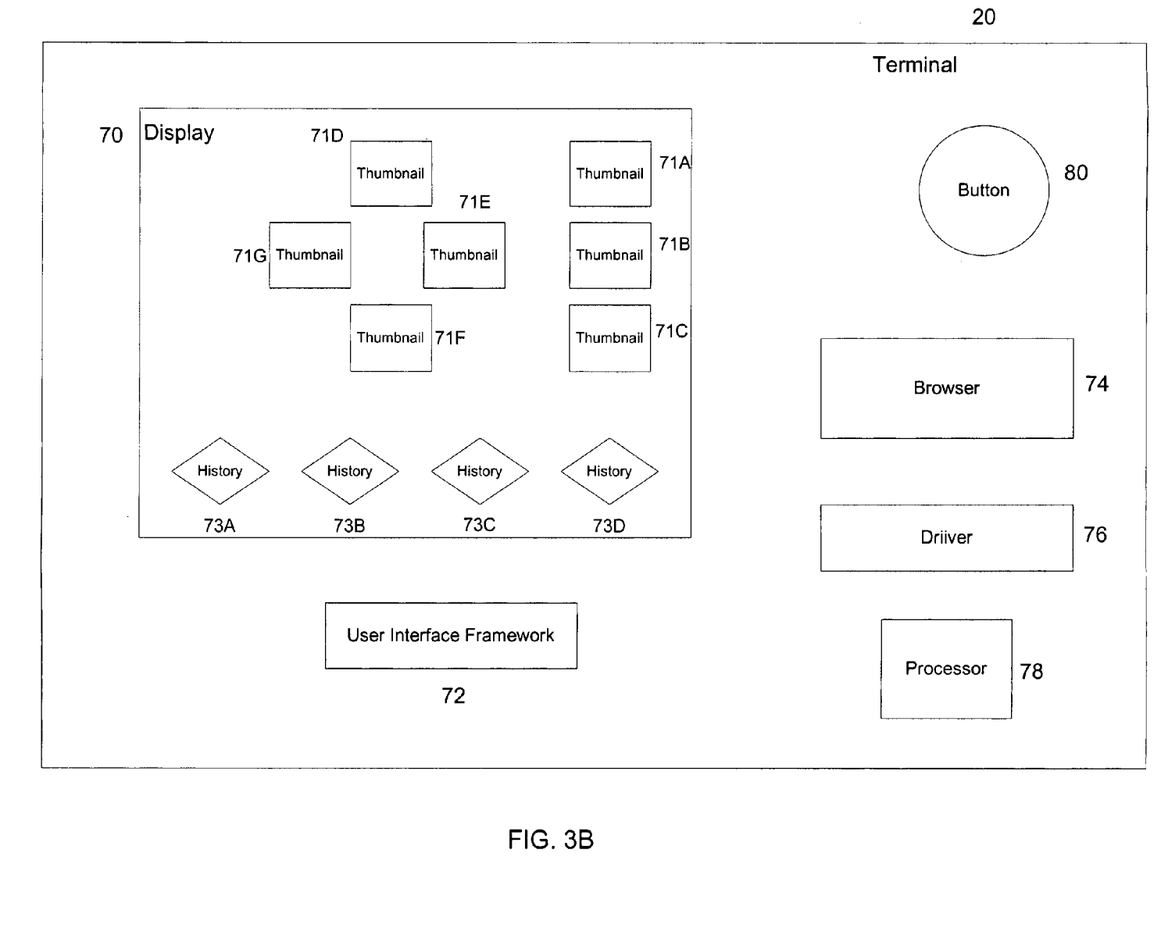
FIG. 3B is a more detailed block diagram of a mobile terminal, which shows the spatial storage of bookmarks and history on the display, operating within the system shown in FIG. 1.

FIGS. 3A and 3B are a more detailed block diagram of a terminal, which shows the spatial storage of bookmarks and history on the display operating within the system shown in FIG. 1. FIG. 3A differs from FIG. 3B in that toolbar 73 is depicted in FIG. 3A have not in FIG. 3B. Therefore, both FIGS. 3A and 3B will be discussed simultaneously.

Referring to FIGS. 3A and 3B, the terminal 20 includes a display 70, a user interface (UI) framework 72, a browser 74, a driver 76, and processor 78. Each element is shown here for reference only and the location of each element is not intended to be a defined location of one element relative to the other elements. For example, the user interface 72 may be located in the display, as a part of the display, or independent of the display. The display 70 is spatially divided for visual storage of thumbnails 71A-71G of the bookmarks selected by the user. In one example embodiment, the display 70 in FIG. 3A includes a tool bar portion 73 that contains history 73A-73D of various web pages or URLs visited. In another example embodiment, shown in FIG. 3B, the spatial structure of the display 70 is used to store the history 73A-73D of various web pages or URLs visited. It will be apparent to those of ordinary scale in the art that various ways can be used to generate thumbnails of the bookmarks and the history. With respect to the present embodiment, a view of the display 70 illustrates thumbnails 71A, 71B, 71C stored on the display in a vertical orientation in the upper right hand portion of the display 70. Thus, the user has a visual display of the thumbnails of the bookmarks, which are spatially organized in a vertical manner. Similarly, the user has selected to organize and group the bookmarks 71D, 71E, 71F, and 71G in another portion of the display 70 in accordance with a polar spatial organizational scheme. It will be apparent to those of ordinary skill in the art that the any spatial organizational scheme can be utilized in response to how the spatial division of the area of display 70. Thus, the user's ability to recall the content of a bookmark is greatly enhanced, even if the bookmark does not include textual reference to its content because of the spatial location of the bookmark relative to other bookmarks. Therefore, the user may more easily finding selected bookmarks based solely on their location of the screen.

Still referring to FIGS. 3A and 38, similarly, the thumbnails of the history 73A, 73B, 73C and 73D can be spatially organized. For example, the history 73A, 73B, 73C and 73D are organized linearly and include a thumbnail snap shot of the pages visited. In the example embodiments discussed, the latest history is visually shown as a snapshot in a selected spatial area of the display 70 and selecting a history item will show the content of the page as it was when the history information was collected and stored. Thus, spatial organization is utilized so that the user can easily select the desired history thumbnail corresponding to the web page that the user wants to revisit. The visual thumbnails of each history includes the URL address of the selected Internet address object, which may be shown as a hint. The spatial position of each thumbnail on the display 70 as well as what information is stored about each web page, depending on whether it is bookmark or history, is defined by the user and controlled by the driver 76.

Still referring to FIGS. 3A and 3B, the driver 76 resides in the memory of the processor 78 along with other data, such as the Internet address of the global address server 36 and software, such as the browser 74. As the terminal 20 is turned on, the driver 76 retrieves data relating to the Internet address of the global address server 36. In an example embodiment, the driver 76 may be EPOC6, which is operating system software that handles hardware related functions in the terminal as well as offer a functioning environment to the application layer programs. Once the terminal 20 is power on, it is coupled to the access point 22 and the ISP 24. Thus, the terminal 20 is able to obtain its own Internet address.

Using the Internet address of the global address server 36, the terminal 20 is coupled to the global address server 36 and sends a request in order to obtain the Internet address of the server 28. Once the terminal 20 has the Internet address of its server 20, it is then connected to the server 28. The server 28 authenticates, using the unique identity of the processor 78 of the terminal 20, that the terminal 20 has shared or group access privileges. Accordingly, the terminal 20 is authenticated and logged onto the server 28 to begin a shared session at a shared or group level. Thus, the user can now access services or retrieve information from the server 28 or the Internet 26. In order for the user to initiate an individual session and retrieve individual information, the user must use the terminal 20 and provide further authentication to the server 28 to gain access at the individual level. Then each terminal includes a unique identification and which is reserved and used by members belonging to the same group. Each of the unique identifications of the terminals is recognized in the server 28 to be used by the members of the group. Every member belonging to the respective group may use the same terminal. When one or more terminals, each of the terminals having a unique terminal identification, is switched on, then each terminal belonging to the same group requests from the global address server 36 with terminal unique identification the address of the server 28 in which the applications and services are stored and ready for use. Then each of the terminals belonging to the same group will get address of the same server 28 into which each of the terminals are connected. As would be appreciated by one of ordinary skill in the art, either at shared/group or at individual level, the user is able to the retrieve the information related to the group of users as well as browse the Internet 26 to retrieve information.

Still referring to FIGS. 3A and 3B, the browser 74 is a typical browser and includes such features as Hyper-Text Transfer Protocol (HTTP), JAVA script, and cascade style sheet capability. As with typical Personal Computers (PCs), the browser 74 helps the user to navigate through and retrieve information from the Internet once the user is connected to the ISP 24 through the terminal 20. The user utilises the terminal 20 to connect to both the ISP 24 and the server 28 using authentication protocol as discussed in detail herein. The terminal 20 is the primary means of access by the user to the server 28 and the related services and applications. However, the user can also access the ISP 24 and the server 28 using the terminal 21 or non-mobile terminal using appropriate shared/group access authentication initiated manually.

Still referring to FIGS. 3A and 3B, in order to retrieve information or request services from the server 28 or the Internet 26, the user provides input through the user interface (UI) framework 72. The user can provide input using a virtual keyboard displayed on the display 70. Even though the virtual keyboard is used as the user retrieves information from the Internet 26, such as a web page, the user can receive the information at the display 70 of the terminal 20 in a full screen format. Full screen format is available because the UI framework 72 disappears when the user types a Universal Resource Locator (URL) or follows a hyperlink while navigating the Internet 26. In order to return to the UI framework 72, the user presses a button 80 and the virtual keyboard as well as the header and footer related to the services are presented again. Additionally, once the user presses the button 80, the web page, which was a full screen displayed prior to pressing the button 80, is reduced to a thumbnail view and positioned in the display 70, such as in the bottom left corner of the footer. Consequently, the user has a shortcut to quickly access the web page that was previously visited or to save that web page as a bookmark.

Figure 4:
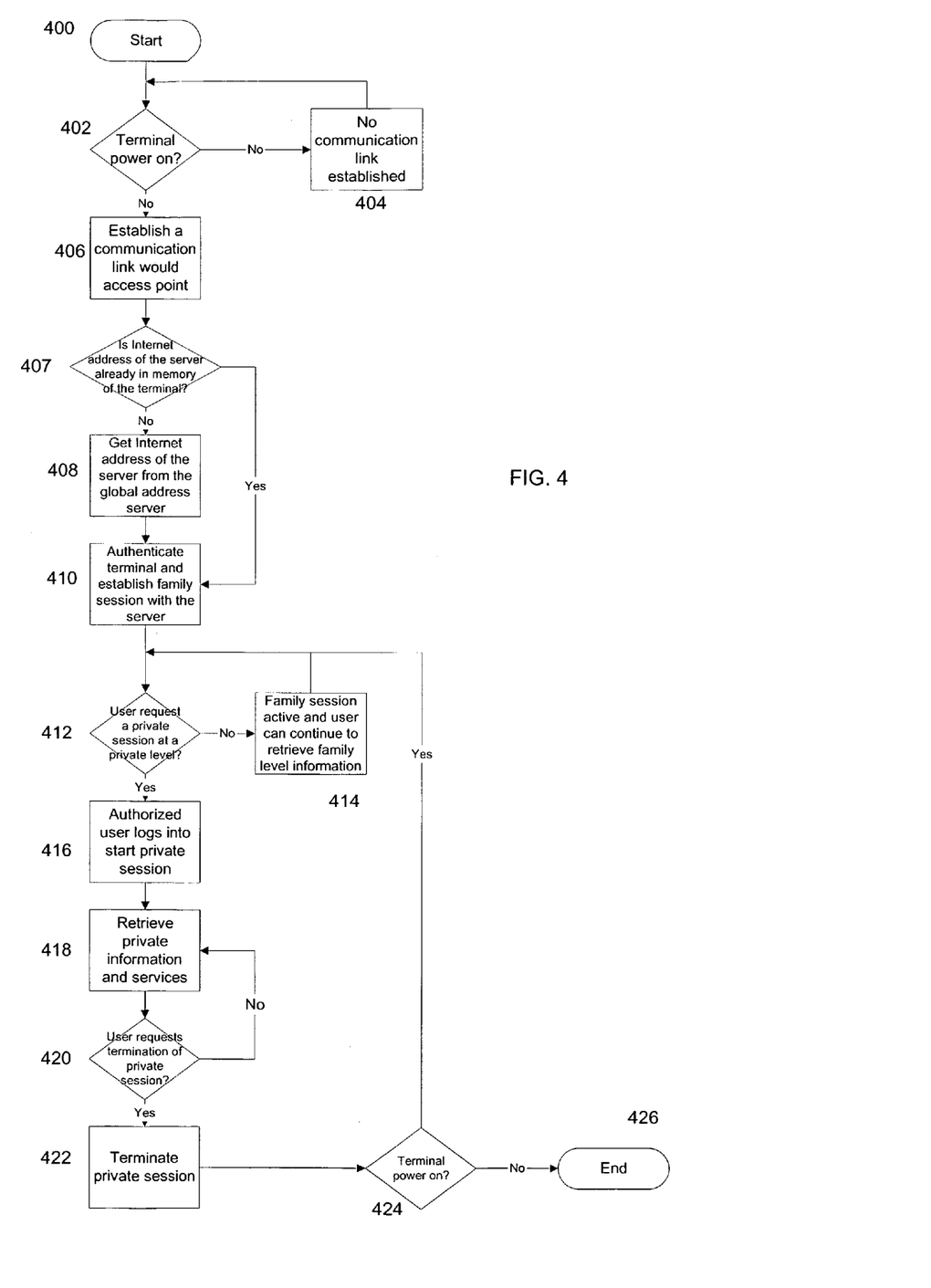
FIG. 4 is a flowchart of the process for establishing a shared session and an individual session between the terminal and the server of FIG. 1.
Figure 5:
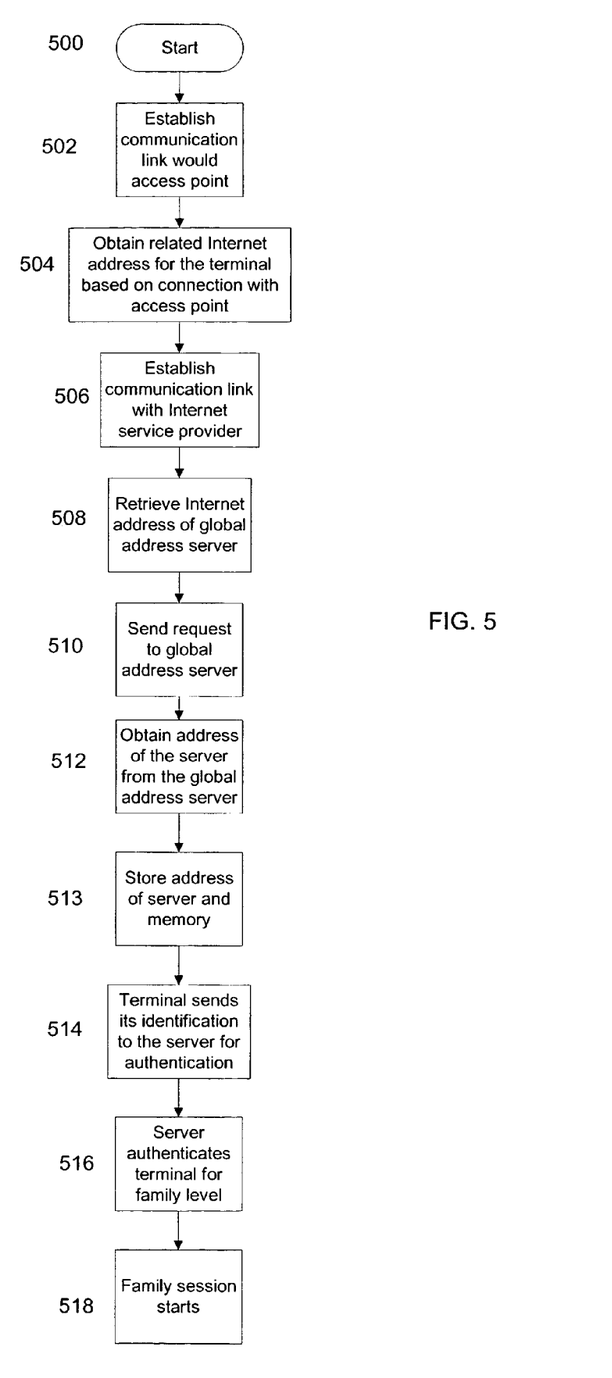
FIG. 5 is a flowchart of the process for establishing a communication link between the terminal and the server.

Before entering into a discussion of the remaining figures it should be noted that the flowcharts shown in FIGS. 4 and 5, contain software, firmware, processes or operations that correspond, for example, to code, sections of code, instructions, commands, objects, or the like, of a computer program that is embodied, for example, on a storage medium such as, but not limited to, floppy disk, CD Rom, EP Rom, RAM, hard disk, etc. Further, the computer program can be written in any language such as, but not limited to, for example C++.

FIG. 4 is a flowchart of the process for establishing a shared session and an individual session between the terminal and the server of FIG. 1. In FIG. 4, the process of authenticating a terminal 20 at the shared or group level in order to initiate a shared or group session and authenticating the user at the individual level to initiate an individual session, beings in operation 400 and immediately proceeds to operation 402. In operation 402, it is determined whether the terminal is powered on. At operation 404, if it is determined that the terminal is not powered on, then a communication link cannot be established through an access point 22 to the server 28 and, hence, the process returns to operation 402 until the terminal is powered on. However, if the terminal 20 is powered on, then the terminal 20 establishes a connection to the access point 22 and, hence, to an ISP 24 and a global address server 36. Thereafter, in operation 408, the terminal obtains the Internet address of its server from the global address server 36.

Still referring to FIG. 4, in operation 410, the terminal 20 communicates with the server 28 and is authenticated as an authorized terminal 20 with access to information and services at the shared or group level and the shared or group session begins and continues until the terminal is turned off. Additionally, the group profile is downloaded to the terminal 20 when the shared session is active. Once the server 28 recognises the terminal 20, establishing the shared session is an automatic background activity carried out by the terminal 20 and transparent to the user, which is further discussed with respect to FIG. 5. In order for the user to establish an individual session and access individual information and services, the user has to log in as an individual user at the individual level.

Still referring to FIG. 4, in operation 412 it is determined if the user is an authorized individual user. At operation 414, if the user is not authenticated as an individual user, then the user will only be given access to a shared session with the shared level information and services. However, in operation 416, if the user is an authorised individual user, then an individual session is established and the user is allowed access to the individual information and services. Although the individual level information and services may be the same for all users, the content will vary from user to user.

Processing then proceeds to operation 418, in the individual session the user retrieves information and uses the individual level services provided by the server. In operation 420, it is determined if the user wants to terminate the individual session and return to the shared level. If it is determined that the user does not want to terminate the individual session, then the user continues the individual session at the individual level and the process returns to operation 418. However, if it is determined that the user wants to terminate the individual session, then at operation 422, the individual session is terminated and the user goes from the individual level to the shared or group level. Thereafter in operation 424, it is determined if the terminal 20 is still powered on. If the terminal is powered on, then the process returns to operation 412 with the user at the shared or group level in a shared/group session. However, if the terminal is turned off, then the shared session is also terminated that the terminal 20 is logged off of the server 28 and the process ends in operation 426.

Therefore, once the server authenticates the terminal 20, then a shared session begins at the shared/group level. Once the user is recognized as an individual user, then an individual session is initiated. Consequently, an individual session remains in effect until the user explicitly terminates the individual session, whereas a shared/group session remains in effect until the terminal is turned off. Additionally, during a shared session when a predetermined period of time expires without any input from the user, then the terminal 20 can enter standby mode in order to conserve battery life until the terminal 20 (in the case of a mobile terminal) receives an input from the user. Other features can be included, such as termination of the individual session if no input is received from the user after a predetermined period of time.

FIG. 5 is a flowchart of the process for establishing a communication link between the terminal and the server. In FIG. 5, the process of establishing a communication link to an access point, operation 406 of FIG. 4, and obtaining the Internet address of an server 28 for that terminal 20, operation 408 of FIG. 4, for initiating a shared session at the shared level, begins in operation 500 can immediately proceeds to operation 502. In operation 502, the terminal establishes a communication link with the access point 22. In operation 504, the terminal 20 obtains its Internet address from the access point 22 based on the Internet address of the access point 22 with which the terminal 20 has established the communication link. Thereafter, in operation 506, the terminal 20 establishes a communication link 32 with the ISP coupled to the access point 22. In operation 508, the terminal 20 retrieves the Internet address of the global address server 36 from its memory. Thereafter, in operation 510, the terminal 20 sends a request to the global address server 36 for the Internet t address of the server 28 that is associated with the terminal. Processing then proceeds to operation 512, the global address server returns the Internet address of the appropriate server 28 to the terminal 20. In operation 514, the terminal 20 sends its identification information to the server 28 located at the Internet address provided by the global address server 36 in order to establish a communication link with the server 28. Then in operation 516, the server 28 authenticates the terminal 20 and a shared/group session at the shared/group level is established between the server 28 and the terminal 20. Then in operation 518 a family or group session then begins.

Figure 6:
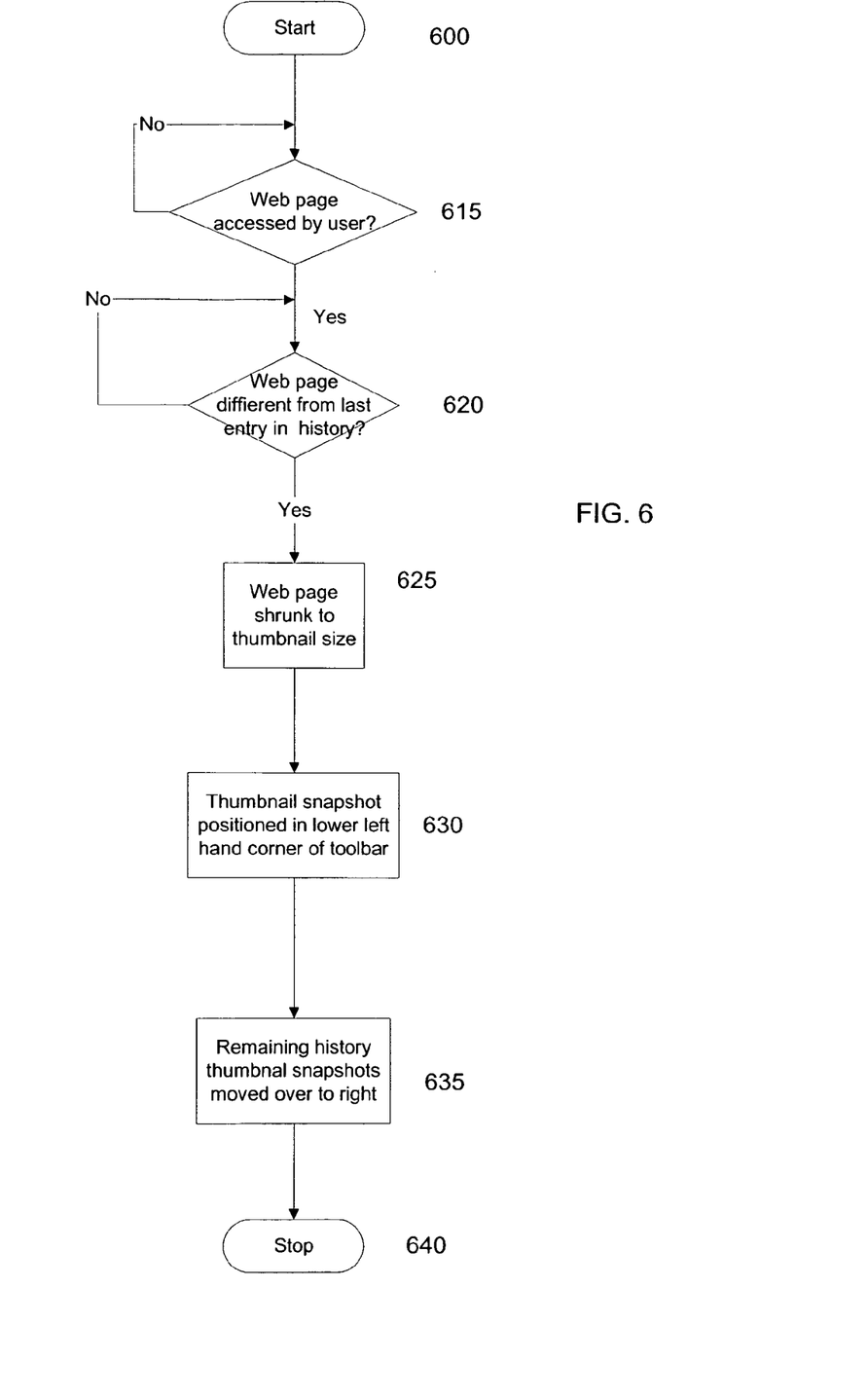
FIG. 6 is a flowchart of a process for generating a history of web pages visited that can be easily recognized and accessed.

FIG. 6 is a flowchart of a process for generating a history of web pages visited that can be easily recognized and accessed. A history of web pages accessed by the user is depicted and FIG. 3A and FIG. 3B. It should be noted that in FIG. 3A histories 73A through 73D are shown contained within the toolbar 73, while in FIG. 3B the histories 73A through 73D are shown as contained within displays 70. Providing the histories 73A through 73D within toolbar 73 enables the user to scroll from left to right in order to view the most recent to the least recent web pages accessed. As in the case of thumbnail snapshots 71A through 71G the histories 73A through 73D are depicted as thumbnail snapshots. Therefore, by viewing these histories 73A through 73D it is possible for user to quickly determine any web site the user wishes to revisit. Also sends it is likely that the most recent web pages accessed would be the ones most likely to be revisited the user may quickly revisit these web pages since they would be displayed on the users screen.

The processing illustrated in FIG. 6 begins in operation 600 and immediately proceeds to operation 615. In operation 615, processor 78 determines whether the user has accessed a web page. If the user has not accessed a web in operation 615 then processing looks back to operation 615 until the user accesses a web page. However, if the user accesses a web page then processing proceeds to operation 620. In operation 620, it is determined if the web page accessed is different from the last entry in the history. This is done in order to a sure that duplicate thumbnail snapshots of the same web page without the year in toolbar 73 or display 70. If the web page is the same as the last entry in the history then processing loops back to operation 620 until the change in web pages occurs. Again, this prevents multiple identical entries of a web page from being placed in toolbar 73 or display 70. However, if the user has accessed a new web page previously not stored in the history then processing proceeds to operation 625. In operation 625 the web page is accessed and reduced in size to a thumbnail snapshot. This thumbnail snapshot appears in the lower left-hand corner of display 70 or toolbar 73 for the user to view. Thereafter, in operation 635 the remaining thumbnail snapshots are moved to the right as shown in toolbar 73 and display 70 in FIG. 3A and FIG. 3B. Processing then proceeds to operation 640 where execution terminates in the case of the user exiting the system.

Therefore, a history of web sites accessed is maintained and visually presented to the user. This history would be depicted as either in the form of a toolbar 73 which the user could manipulate to access and entire history or simply as a portion of a display 70.

The benefit provided by the example embodiments of the present invention is that the user may revisit desired web pages by viewing thumbnail snapshots. The most recent thumbnail snapshots of web sites accessed are displayed for the user and may be quickly selected for reviewing.

While we have shown and described only a few examples herein, it is understood that numerous changes and modifications as known to those skilled in the art could be made to the present invention. For example, the layout of a screen may vary based upon individual needs. Further, example embodiments of the present invention may be incorporated into any browser for accessing a history. Still further, the positioning a history on a screen may be done by the user or performed by an automatic function based on alphabetical order or date of access to the web site. Therefore, we do not wish to be limited to the details shown and described herein, but intend to cover all such changes modifications as are encompassed by the scope of the appended claims.

We claim:

1. A method of presenting and managing a history of web pages accessed, comprising:
   accessing a web page by a user;
   reducing the size of the accessed web page to a thumbnail snapshot;
   comparing the accessed web page content to a previously accessed web page content; and
   displaying the thumbnail snapshot of the accessed web page to the user in an area of a screen if the accessed web page content and the previously accessed web page content are not the same, wherein the thumbnail snapshot provides one or more options that, when selected by a user, store the thumbnail snapshot as a bookmark.

2. The method recited in claim 1, wherein prior to the reducing the size of the accessed web page to a thumbnail snapshot, further comprising:
   checking a history file to determine if the accessed web page is in the history file; and
   reducing the size of the web page only when the accessed web page is not in the history file.

3. The method recited in claim 2, wherein the thumbnail snapshot is displayed to the user in a toolbar.

4. The method recited in claim 3, wherein the toolbar is able to scroll and display a plurality of thumbnail snapshots from the most recent to the least recent.

5. The method recited in claim 1, further comprising:
   displaying one or more thumbnail snapshots of bookmarked web pages in a second area of the screen.

6. The method recited in claim 5, wherein the screen is embodied in a cellular phone the thumbnail snapshots of the bookmarked web pages being arranged in a polar spatial organizational scheme.

7. The method of claim 1, wherein the area of a screen containing only history information displays a plurality of thumbnail snapshots of previously accessed web pages simultaneously.

8. The method recited in claim 1, wherein the screen is embodied in a cellular phone or a personal digital assistant.

9. A computer program embodied on a computer readable medium and executable by a computer for presenting and managing a history of web pages accessed, when executed performing the steps of:
   accessing a web page by a user;
   reducing the size of the accessed web page to a thumbnail snapshot;
   comparing the accessed web page content to a previously accessed web page content; and
   displaying the thumbnail snapshot of the accessed web page to the user in an area of a screen containing history information only if the accessed web page content and the previously accessed web page content are not the same.

10. The computer program recited in claim 9, wherein prior to the reducing the size of the accessed web page to a thumbnail snapshot, further comprising:
    checking a history file to determine if the accessed web page is in the history file; and
    reducing the size of the accessed web page only when the web page is not in the history file.

11. The computer program recited in claim 10, wherein the thumbnail snapshot is displayed to the user in a toolbar.

12. The computer program recited in claim 11, wherein the toolbar is able to scroll and display a plurality of thumbnail snapshots from the most recent to the least recent.

13. The computer program recited in claim 9, further comprising:
    displaying one or more thumbnail snapshots of bookmarked web pages in a second area of the screen.

14. The computer program recited in claim 13, wherein the thumbnail snapshots of the bookmarked web pages are arranged in a polar spatial organizational scheme.

15. The computer program recited in claim 9, wherein the screen is embodied in a cellular phone or a personal digital assistant.

16. A terminal, comprising:
    a processor;
    a screen; and a computer program embodied on a computer readable medium and executable by the processor for presenting and managing a history of web pages accessed, when executed performing the steps of:

accessing a web page by a user;

reducing the size of the accessed web page to a thumbnail snapshot;

comparing the accessed web page content to a previously accessed web page content; and displaying the thumbnail snapshot of the accessed web page to the user in an area of the screen containing history information only if the accessed web page content and the previously accessed web page content are not the same.

17. The terminal recited in claim 16, wherein, when executed, the computer program, prior to the reducing the size of the accessed web page to a thumbnail snapshot, further performs the steps of:

checking a history file to determine if the accessed web page is in the history file; and reducing the size of the accessed web page only when the web page is not in the history file.

18. The terminal recited in claim 16, wherein the thumbnail snapshot is displayed to the user in a toolbar.

19. The terminal recited in claim 18, wherein the toolbar is able to scroll and display a plurality of thumbnail snapshots from the most recent to the least recent.

20. The terminal recited in claim 16, wherein, when executed, the computer program further performs the step of:

displaying one or more thumbnail snapshots of bookmarked web pages in a second area of the screen.

21. The terminal recited in claim 20, wherein the thumbnail snapshots of the bookmarked web pages are arranged in a polar spatial organizational scheme.

22. The terminal recited in claim 16, wherein the area of a screen containing only history information displays a plurality of thumbnail snapshots of previously accessed web pages simultaneously.

23. The terminal recited in claim 16, wherein the terminal is a cellular phone or a personal digital assistant.

* * * * *